(12) United States Patent
Gorablenkow et al.

(10) Patent No.: US 8,908,337 B2
(45) Date of Patent: Dec. 9, 2014

(54) CURRENT TRANSFORMER ARRANGEMENT

(75) Inventors: Jörg Gorablenkow, Berlin (DE);
Andreas Groiss, Falkensee (DE);
Thomas Hilker, Stahnsdorf (DE); Peter Stenzel, Falkensee (DE)

(73) Assignee: Siemens Aktiengesellschaft, Munich (DE)

(*) Notice: Subject to any disclaimer, the term of this patent is extended or adjusted under 35 U.S.C. 154(b) by 114 days.

(21) Appl. No.: 13/695,085

(22) PCT Filed: Apr. 21, 2011

(86) PCT No.: PCT/EP2011/056410
§ 371 (c)(1),
(2), (4) Date: Nov. 20, 2012

(87) PCT Pub. No.: WO2011/134884
PCT Pub. Date: Nov. 3, 2011

(65) Prior Publication Data
US 2013/0135776 A1    May 30, 2013

(30) Foreign Application Priority Data
Apr. 27, 2010  (DE) .......................... 10 2010 018 969

(51) Int. Cl.
| H02H 7/04 | (2006.01) |
| H01F 27/40 | (2006.01) |
| H02H 9/06 | (2006.01) |
| H01F 38/30 | (2006.01) |

(52) U.S. Cl.
CPC ............. H02H 7/042 (2013.01); H01F 27/402 (2013.01); H02H 9/06 (2013.01); H01F 38/30 (2013.01)
USPC .................................. 361/40; 361/35; 361/38

(58) Field of Classification Search
CPC ........... H02H 7/04; H02H 7/042; H02H 9/06
USPC ........................................................ 361/40
See application file for complete search history.

(56) References Cited

U.S. PATENT DOCUMENTS

| 4,471,333 A | 9/1984 | Stephanides |
| 4,901,182 A * | 2/1990 | Book ............................. 361/38 |
| 7,755,873 B2 * | 7/2010 | Crevenat et al. ............. 361/91.1 |

FOREIGN PATENT DOCUMENTS

| CH | 675924 A5 | 11/1990 |
| DE | 286453 A5 | 1/1991 |
| DE | 9115648 U1 | 4/1992 |
| DE | 4322944 A1 | 5/1994 |
| DE | 4318367 A1 | 12/1994 |
| DE | 102005003870 A1 | 8/2006 |
| EP | 0063636 A1 | 11/1982 |
| EP | 0655561 A1 | 8/1995 |
| EP | 0666578 A1 | 8/1995 |
| WO | 2006077181 A1 | 7/2006 |

OTHER PUBLICATIONS

Henmi et al., Gas Insulated Switchgear, Date: Oct. 9, 2008, Abstract, Specification, Figures 1-4.*

* cited by examiner

Primary Examiner — Dharti Patel
(74) Attorney, Agent, or Firm — Laurence A. Greenberg; Werner H. Stemer; Ralph E. Locher (57) ABSTRACT

A current transformer configuration includes a primary part and a secondary part. The primary part is surrounded by a housing. The housing has a first conductive housing part and a second conductive housing part. An electrically insulating gap lies between the two conductive housing parts. The housing passes through the secondary part. The electrically insulating gap is bridged by a surge protection configuration.

10 Claims, 4 Drawing Sheets

CURRENT TRANSFORMER ARRANGEMENT

BACKGROUND OF THE INVENTION

Field of the Invention

The invention relates to a current transformer arrangement comprising a primary part, which is surrounded by a housing with at least one electrically insulating gap arranged between a first and a second electrically conductive housing part and passes through a secondary part.

Such a current transformer arrangement is known, for example, from the laid-open specification DE 10 2005 003 870 A1. The current transformer arrangement from said document has a primary part, which is surrounded by an electrically conductive housing. The electrically conductive housing for its part is surrounded by a secondary part, with the result that the primary part also passes through the secondary part. The electrically conductive housing is equipped with an electrically insulating gap. An electrically insulating gap limits propagation of parasitic currents in the housing which could influence measurement results of the current transformer arrangement.

Current transformer arrangements are preferably used for providing the possibility of detecting currents which flow in high-voltage installations. For such installations, provision is made for ground potential to be applied to electrically conductive parts that are not used as phase conductors for current conduction. Thus, for example, ground potential needs to be applied to all of the electrically conductive housings, supporting elements, barrier gratings, etc. This prevents undesired electrical charges from being produced which, in the event of touching contact, for example by means of operating personnel, can result in an electrical flow which poses a hazard to the operating personnel.

If an electrically insulating gap is provided in a current transformer arrangement in order to electrically insulate two housing parts of the electrically conductive housing from one another, grounding of the two housing parts cannot readily be provided. If the two housing parts were to be grounded for safety reasons in such a way that the grounding path passes through the secondary part, the gap would be short-circuited and the electrically insulating effect of the gap would not hold. Thus, grounding of all of the housing parts can only take place outside the secondary part for reasons of operational safety. However, operational safety also needs to be ensured in the interior of the secondary part.

BRIEF SUMMARY OF THE INVENTION

Therefore, the object of the invention consists in specifying a current transformer arrangement which has improved operational safety with an effective electrically insulating gap.

In accordance with the invention, the object is achieved in the case of a current transformer arrangement of the type mentioned at the outset by virtue of the fact that the gap is bridged by a surge protection arrangement.

The electrically conductive housing parts are, for example, part of a housing which surrounds the primary part. The primary part is, for example, an electrical phase conductor, through which an electrical current, driven by a voltage, flows. In this case, the phase conductor should be held and positioned so as to be electrically insulated from ground potential. The primary part is therefore also to be kept electrically insulated from the housing parts. The housing has ground potential at least on one side of the gap, i.e. on one of the housing parts. In order to provide electrical insulation of the phase conductor with respect to this ground potential, the region around the primary part is filled with an electrically insulating medium, preferably a fluid. This fluid can be, for example, a gas under elevated pressure. Suitable for this are, for example, sulfur hexafluoride, nitrogen or mixtures with these gases. The housing can be part of an encapsulation which accommodates the fluid within it and bounds the fluid. In particular in the case of an elevated internal pressure, the housing needs to be configured so as to be correspondingly pressure-tight and fluidtight. The transition from the electrically conductive parts of the housing to the electrically insulating gap and the electrically insulating gap itself need to meet the requirements for a pressure vessel. The housing next to the gap is in this case configured so as to be fluidtight and pressure-tight. Correspondingly, connecting elements of the housing need to be embodied so as to be fluidtight. It is advantageous here if the housing is configured so as to be substantially tubular, with in each case flanges being arranged at the ends as connecting elements in order to connect the housing via the flanges to further assemblies of the encapsulation. Suitable flanges are, for example, flat-face flanges, wherein a sealing element, for example an elastically deformable O-ring, can be positioned on a flange face. The O-ring can in this case be pinch-sealed in a cutout and, in the process, can have its sealing effect on a connecting element of the housing.

The primary part in the form of a phase conductor arranged in the interior of the current transformer arrangement is surrounded by the housing. The secondary part of the current transformer arrangement is arranged outside the housing. The secondary part is, for example, a winding which detects a variable from a current flow, for example a magnetic field, in contactless fashion and produces a proportional image of this variable. It is possible to draw a conclusion on a current flow in the primary part using the information on the current which has been converted by the secondary part.

It is thus possible to detect a current flow in the phase conductor in contactless fashion and thus obtain information on the state of the phase conductor.

An arrangement of the phase conductor within an encapsulation consisting of an electrically conductive material can result in currents being produced within the housing. A current in the housing is induced, for example, by a current flowing in the primary part. In addition to this current, further components can also cause a current flow in the housing. On summation of the currents flowing in the primary part and in the housing part, said currents compensate for one another virtually completely. Thus, contactless measurement of the current in the primary part outside the housing is subject to a high degree of error or is barely possible. As a result of the introduction of an electrically insulating gap, a current flow in the housing is interrupted in the region of the current transformer arrangement, with the result that no compensation of the magnetic fields of the current flowing in the primary part and the current possibly flowing through the housing parts is possible any more. Thus, the secondary part can detect the current flowing in the primary part. The gap can be embodied in a variety of ways. For example, a gaseous or liquid insulation medium can flow through the gap. However, it is also possible for a solid insulation to be provided for forming the gap. By means of solid insulation, it is possible to connect the two housing parts and also to transmit mechanical forces between the two housing parts of the housing via the gap.

The electrically insulating gap should preferably be encompassed azimuthally by the secondary part, i.e. starting from the primary part, the peripheral electrically insulating gap which is closed within itself on an azimuthal path should be covered by the secondary part. An interrupting effect of the gap for parasitic currents, such as reverse currents and eddy currents, takes place in the direct vicinity of the secondary part. The secondary part remains virtually uninfluenced by interference caused by parasitic currents, with the result that precise measurement of the current flowing in the primary part is possible.

A wide variety of designs can be used for the secondary part. Thus for example, provision can be made for a current transformer arrangement to operate on the basis of a transformer principle. The phase conductor acting as primary part acts as primary winding of a transformer and the secondary part has a secondary winding, wherein a corresponding voltage is induced in the secondary winding, and this voltage can drive a current. The current in the primary part of the current transformer arrangement can be mapped via the transformation ratio and the electrical variables which can be measured at the secondary part, such as current, voltage, phase angle.

However, alternative configurations of the secondary part can also be provided. For example, semiconductor assemblies such as Hall sensors can be used in order to detect a field of the current of the primary part. However, fiberoptic windings can also be used.

A polarized light with a specific position of its polarization plane is introduced into a fiberoptic winding, which represents a winding of the secondary part. The position of the polarization plane can be altered by magnetic fields originating from the current flowing in the primary part. The change in the position of the polarization plane is a measure of the electrical current flowing in the primary part. It is thus possible to draw a conclusion on the current flowing in the primary part.

The electrically insulating gap is a precondition for being able to detect or map, in simplified fashion, a current flowing in the primary part outside the housing and in the process to avoid falsification of the measurement result owing to reverse currents, eddy currents or similar parasitic currents which may be flowing in the housing.

Provision can be made for connecting the two housing parts electrically conductively to one another. A low-resistance connection should short-circuit the gap, but the connection should be outside the detection range of the secondary part.

Thus, for example, one or more conductor clips/conductor strips can be arranged on the outer circumference of the secondary part so as to span said secondary part. This low-resistance current path is connected electrically in parallel with the surge protection arrangement, wherein the surge protection arrangement is located within the detection range of the secondary part between the primary part and the secondary part, and the low-resistance current path runs outside the detection range of the secondary part. Thus, the two housing parts are electrically conductively connected in regions which are not covered by the secondary part and are capable of conducting the same electrical potential. Those ends of the housing parts which protrude into the detection range of the secondary part, i.e. the ends which have the electrically insulating gap, are capable of conducting different potentials, however. In particular high-frequency phenomena can reduce the effectiveness of the low-resistance current path lying outside the secondary part and result in potential differences at the electrically insulating gap.

By virtue of the arrangement of a surge protection arrangement over the gap, it is possible to space the two housing parts apart from one another such that they are electrically insulated from one another and, in the event of a potential difference between the two housing parts of the housing, bring about a decrease in this potential difference. For this purpose, ground potential can be applied to one of the housing parts, for example.

An electrically conductive connection between the two housing parts within the secondary part would result in the electrically insulating gap being ineffective with respect to a function of the secondary part. The housing parts are electrically insulated from one another via the gap. The gap can be used for supporting one of the housing parts in electrically insulated fashion. For this purpose, the electrically insulating gap can be formed by electrically insulating angularly rigid material, wherein the two housing parts are connected in angularly rigid fashion to the electrically insulating material. The electrically insulating material can be, for example, ring-shaped insulating resin, a ring-shaped ceramic, etc.

Firstly, surges are prevented from arising by means of a surge protection arrangement at the gap and, as a result, people are protected from the effect of surges and resultant electrical flow. Secondly, the current transformer arrangement itself is also protected from the occurrence of loads as a result of surges. Such surges can result in damage in the secondary part as well, for example. Furthermore, as a result of surges, considerable loading of the electrically insulating material used at the gap can also take place, with the result that the material is damaged in terms of its structure. This can mean that a fluidtightness of this gap or the connection between the material forming the gap and the housing parts is destroyed at least partially and thus a fluidtightness of the housing is no longer provided.

The surge protection arrangement is, in a simple case, formed in the manner of a bridge from one housing part to the other housing part. Then, if required, a leakage current path to ground potential can be formed via this bridge. In the connected, i.e. active, state of the leakage current path, said leakage current path has a reduced impedance in comparison with the impedance of the gap. A discharge current can be directed via the leakage current path which is temporarily connected, and this discharge current reduces a potential difference between the housing parts. Once the surge has been reduced, an increase in the impedance of the leakage current path of the surge protection arrangement between the housing parts which are kept at a distance from one another then takes place again.

Therefore, for a short period of time, the electrically insulating gap in the interior of the secondary part is short-circuited, with the result that, during this time, the electrically insulating effect of the gap is canceled by the leakage current path of the surge protection arrangement.

The surge protection arrangement represents a switchable leakage current path, which if necessary bridges the electrically insulating gap, wherein this leakage current path has a lower impedance during bridging than the electrically parallel electrically insulating gap.

In this case, provision can advantageously be made for the surge protection arrangement to have a frequency-dependent impedance element.

A frequency-dependent impedance element makes it possible to control a connection of the leakage current path depending on the frequency of a surge occurring across the gap. In this case, it has proven to be advantageous to design the frequency-dependent impedance element to be in the form of a high-pass filter. In the case of high-frequency surges, a leakage current path is formed, i.e. the electrically insulating gap is bridged by the surge protection arrangement. A high-frequency surge is short-circuited to ground via the surge protection arrangement, with the result that the surge is reduced. Once the surge has been reduced, the effectiveness of the electrically insulating gap is again provided. The leakage current path of the surge protection arrangement between the housing parts is then again provided with an impedance which tends towards infinity as far as possible. The response of the high-pass filter can be variably adjustable. It is thus possible to ensure that, in the case of regular low-frequency operation of approximately 50 or 60 Hz of the current transformer arrangement, the surge protection arrangement does not respond.

A further advantageous configuration can provide for the impedance element to have a capacitor.

It is possible in a simple manner by means of a capacitor to form a high-pass filter across the electrically insulating gap and thus to reduce high-frequency surges. The capacitor in this case short-circuits the electrically insulating gap depending on the frequency of the voltage applied across the electrically insulating gap and allows currents driven by high-frequency voltages to pass, wherein the high-frequency voltages are discharged to ground potential owing to this current flow.

Provision can be made for a plurality of capacitors to be connected in parallel in order to increase the electrical loadability and for these parallel-connected capacitors to bridge the electrically insulating gap together.

Advantageously, provision can be made for the capacitor to be in the form of a plate capacitor.

A plate capacitor has a structure which can be produced inexpensively, wherein a plate capacitor has a comparatively low physical height given a relatively large area. In particular when arranging a large number of capacitors along the gap, application of a high capacitance is thus possible, with the radial extent of the overall arrangement being enlarged to only a small degree.

Advantageously, provision can be made for a plurality of plate capacitors to be arranged in parallel in the profile of the gap so as to bridge said gap.

A plurality of plate capacitors in the profile of the gap makes it possible to form the plate capacitors such that their shape matches the gap profile. It is thus possible, for example, to configure the plate capacitors to be in the form of shells, with the result that they are arranged and positioned on the housing on the lateral surface thereof in the case of a tubular structure of the housing, for example. In this case, the circumference of the housing is enlarged only to a small degree. Thus, provision can be made, for example, for a plurality of curved plate capacitors to be arranged distributed over the circumference of the housing.

A further advantageous configuration can provide for the surge protection arrangement to have a voltage-dependent impedance element.

In addition to frequency-dependent switching of a leakage current path by the surge protection arrangement, provision can alternatively or additionally be made for the impedance element to control this leakage current path in a voltage-dependent manner as well. Independently of the frequency of a surge, merely owing to the absolute value of the potential difference present across the gap, this surge can be reduced by the surge protection arrangement by forming a leakage current path bridging the electrically insulating gap.

It is thus possible to reduce DC voltages as well independently of the type of voltage, for example. Provision can also be made for different trigger stages to be provided at the surge protection arrangement. These different stages can possibly also respond in accordance with different criteria, such as a frequency or a potential difference, for example.

An advantageous configuration can provide for the impedance element to have a coordinating spark gap.

A coordinating spark gap represents a configuration of an impedance element of a surge protection arrangement which is simple in terms of design. By means of spacing apart corresponding electrodes, it is possible to set a protection level for a spark gap. By varying the spacing and/or shape of the electrodes from one another, the response of the surge protection arrangement can be adjusted. A coordinating spark gap can also be used in addition to further impedance elements, such as capacitors or other possible impedance elements, for example, with the result that the coordinating spark gap also exerts a protective effect for the other impedance elements. It is thus possible, for example in the case of very high surges, to allow these surges to be reduced initially via the coordinating spark gap and for a remaining surge to be reduced by means of further impedance elements.

Furthermore, provision can advantageously be made for the impedance element to have a varistor.

Varistors are components which change their impedance depending on the voltage applied via the varistor. Varistors are, for example, semiconductor components which are structured on the basis of metal oxide. By virtue of the selection and shaping of the metal oxide, it is possible to adjust the response of the varistor.

In this case, a property of varistors consists in that a reduction in the impedance of the varistor is only continued as long as the applied voltage exceeds a specific response voltage. Once the response voltage is undershot, the varistor assumes a high-impedance mode of operation, i.e. its electrical impedance should preferably tend towards infinity. In this case, care should be taken to ensure that the voltages applied to the varistor do not exceed a specific breakdown voltage since such an event would result in destruction of the varistor.

As is also the case when using a plurality of capacitors connected electrically in parallel with one another, it is also possible for a plurality of varistors to bridge, in parallel, the electrically insulating gap. This makes it possible to distribute a leakage current among a plurality of parallel current paths of a plurality of varistors in the event of a surge. A more favorable distribution of a plurality of varistors which are designed to be correspondingly small over the circumference of the housing is thus made possible.

Furthermore, provision can advantageously be made for the gap to extend in the radial direction between the primary part and the secondary part.

Advantageously, the current transformer arrangement should be configured so as to be approximately rotationally symmetrical, wherein, starting from the primary part, the further component parts extend outwards in the radial direction in succession. The primary part itself is surrounded by an electrically insulating medium. The electrically insulating medium is bounded by the housing. The housing in turn is surrounded by the secondary part of the current transformer arrangement. In this case, the gap should run peripherally around the primary part in the azimuthal direction so as to be closed per se, with the result that the two housing parts are electrically insulated from one another via the electrically insulating gap and are possibly mechanically connected to one another. As a result of the arrangement of the gap between the primary part and the secondary part, it is possible to keep the detection range of the secondary part as free from interference in the housing such as reverse currents or eddy currents as possible. When detecting the current in the primary part in the direct vicinity of the gap, it is possible to keep the gap relatively narrow.

BRIEF DESCRIPTION OF THE SEVERAL VIEWS OF THE DRAWING

An exemplary embodiment of the invention will be shown schematically in a drawing and described in more detail below. In the drawing.

DESCRIPTION OF THE INVENTION

Figure 1:
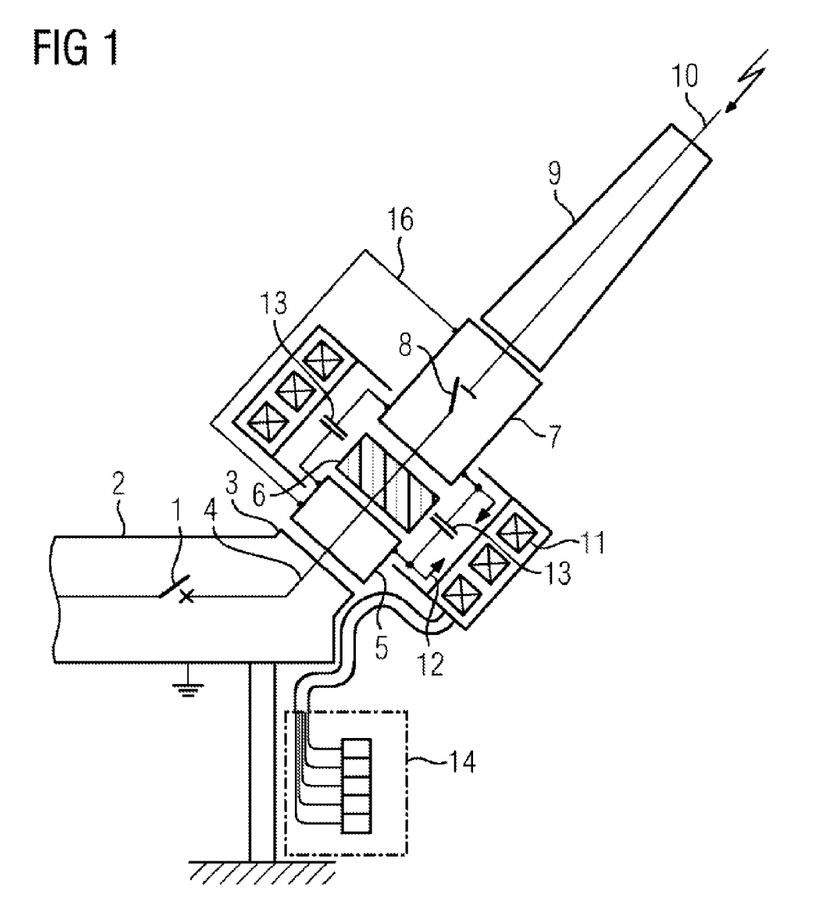
FIG. 1 shows a section through a current transformer arrangement with a surge protection arrangement with a capacitor and a coordinating spark gap.

FIG. 1 shows a switching device in section, with individual component parts of an encapsulation being spaced apart from one another in the manner of an exploded illustration for reasons of better identifiability.

The switching device shown in FIG. 1 is a compressed-gas-insulated switching device, i.e. phase conductors of the switching device are arranged within an encapsulation which has a fluidtight configuration, the interior of the encapsulation being filled with an electrically insulating fluid at elevated pressure, preferably an insulating gas. In this case, the encapsulation has different sections.

The arrangement shown in FIG. 1 has a circuit breaker 1. The circuit breaker 1 is equipped with an interrupter unit, which has switching contact pieces movable relative to one another. The interrupter unit of the circuit breaker 1 is arranged in the interior of a circuit breaker encapsulating housing 2. In this case, only a section of the circuit breaker encapsulating housing 2 is illustrated. The circuit breaker encapsulating housing 2 has a first connector 3, which serves to introduce a phase conductor 4 into the interior of the circuit breaker encapsulating housing 2. The phase conductor 4 is arranged so as to be electrically insulated from the circuit breaker encapsulating housing 2 and the electrically insulating fluid, for example sulfur hexafluoride gas, which is arranged in the interior of the circuit breaker encapsulating housing 2 flows around said phase conductor.

A first housing part 5 is flange-connected to the first connector 3. A fluidtight connection is provided between the first housing part 5 and the first connector 3, with the result that the electrically insulating fluid can also flow through the first housing part 5. The first housing part 5 is connected to a second housing part 7 via an electrically insulating gap 6. The first housing part 5 and the second housing part 7 are each manufactured from an electrically conductive material and are each connected in fluidtight fashion to the electrically insulating gap 6 located between the two housing parts 5, 7. For example, an insulating tube consisting of a polymer or ceramic can be used for the gap 6. The first housing part 5, the electrically insulating gap 6, the second housing part 7 are part of a housing of a current transformer arrangement. The first housing part 5, the second housing part 7, the electrically insulating gap 6 each have a substantially rotationally symmetrical structure, with these structures being aligned coaxially with the phase conductor 4 which passes through the first housing part 5, the second housing part 7 and the electrical gap 6.

FIG. 1 shows, by way of example, that further component parts, in this case a switch disconnector 8, for example, can also be arranged within the second housing part 7. An outdoor bushing 9 is arranged, by way of example, on that side of the second housing part 7 which is remote from the electrically insulating gap 6. By means of the outdoor bushing 9, it is possible to guide the phase conductor 4 out of the interior of the second housing part 7 to a point outside the second housing part 7 and to form a connection point 10 there, for example, to which an overhead line can be connected. Thus, the phase conductor 4 can be incorporated into an electrical energy transmission network.

It remains to note that the configurations shown in FIG. 1 and in the other figures merely represent examples of the use of a current transformer arrangement according to the invention. In respect of shape, arrangement and integration of the current transformer arrangement, a wide variety of variants can be provided. It is thus possible, for example, for provision to be made for the current transformer arrangement to also be located within a conductor run of a gas-insulated switchgear assembly, with the result that further housings which have electrically conductive properties are connected to the second housing part 7.

The region of the electrically insulating gap 6 is surrounded by a secondary part 11 of the current transformer arrangement. In this case, three cores are provided on the secondary part 11, each of said cores bearing windings, in which a proportional voltage is induced depending on a current flow in the phase conductor 4, which in this case acts as primary part of the current transformer arrangement. FIG. 1 shows a current transformer arrangement with a primary part 4 and a secondary part 11 which interact using the transformer principle. The secondary part 11 is connected to a terminal box 14 via corresponding connection lines, with it being possible for variables which are proportional to a current flow in the phase conductor 4 to be tapped off at the contact-making points of said terminal box and to then be further-processed. In this case, provision can be made for a conversion, amplification, etc. of the physical variables produced by the secondary part 11 to be performed within the terminal box 14 as well.

Ground potential is applied to the circuit breaker encapsulating housing 2. This potential is also transmitted to the first housing part 5, which is manufactured from an electrically conductive material, via the flange connection of the first housing part 5 to the first connector 3 of the circuit breaker encapsulating housing 2. Owing to the electrically insulating effect of the electrically insulating gap 6, which runs around the phase conductor 4 in intrinsically closed fashion, a transmission of this ground potential via the electrically insulating gap 6 to the second housing part 7, which is likewise manufactured from an electrically conductive material, is not possible.

A low-resistance electrically conductive connection 16 is arranged between the first housing part 5 and the second housing part 7. The low-resistance connection 16 transmits the electrical potential of the first housing part 5 to the second housing part 7. The low-resistance connection 16 in this case runs outside the detection range of the secondary part 11. Thus, the gap 6 for the secondary part 11 continues to have an electrically insulating effect with respect to a detection of an electrical current flowing in the phase conductor 4. In the detection range of the secondary part 11, a current flow between the housing parts 5, 7 is suppressed.

In order to protect against surges, such as those which may occur, for example, as a result of switching operations, interference such as lightning strikes or the like, the electrically insulating gap 6 is bridged by a surge protection arrangement. In the exemplary embodiment shown in FIG. 1, the surge protection arrangement has firstly a coordinating spark gap 12. The coordinating spark gap 12 is arranged in parallel with a plurality of capacitors 13, which likewise bridge the electrically insulating gap 6. In this case, the position of the surge protection arrangement within the detection range of the secondary part 11 is selected such that said surge protection arrangement is covered by the secondary part 11 of the current transformer arrangement in the radial direction. Furthermore, owing to the use of a surge protection arrangement with such a design in respect of the phase conductor 4, no additional space is required in the axial direction. In this case, the coordinating spark gap 12 is designed to reduce high surges which can arise between the first housing part 5 and the second housing part 7 across the electrically insulating gap 6. In addition, a frequency-dependent impedance element is provided by means of the capacitors 13, which impedance element cancels the electrically insulating effect of the electrically insulating gap 6, in particular in the case of high-frequency surges, and thus serves to reduce a high-frequency surge produced across the electrically insulating gap 6. However, provision can also be made for a separate formation of a coordinating spark gap 12 to be dispensed with and, depending on the surges to be expected, for the surge protection arrangement to have only one or more frequency-dependent impedance elements.

In this case, the capacitors 13 operate in such a way that, in the case of high-frequency potential differences between the first housing part 5 and the second housing part 7, a low-impedance leakage current path is connected via the electrically insulating gap 6 to ground potential to reduce high-frequency surges. With a reduction in the high-frequency surge, i.e. after a reduction in the potential difference between the first housing part 5 and the second housing part 7, the impedance of the capacitors 13 is increased again, with the result that the electrically insulating gap 6 becomes effective again.

In particular during connection of the surge protection arrangement and subsequent short-circuiting of the electrically insulating gap 6, effectiveness of the current transformer arrangement can only be expected within a restricted scope.

Since, however, it can be assumed that such interference effects only arise during a short period of time, this temporary failure can be tolerated.

FIG. 1 illustrates purely schematically the individual parts 5, 6, 7 of the housing. Furthermore, in the interests of improved clarity, there is no illustration of the fluidtight connection at the first connector 3, the first housing part 5, the electrically insulating gap 6, the second housing part 7 as well as the second housing part 7 and the outdoor bushing 9.

By way of example, a design configuration of the first housing part 5, the electrically insulating gap 6, the second housing part 7 and the surge protection arrangement provided will be described with reference to FIG. 2.

Figure 2:
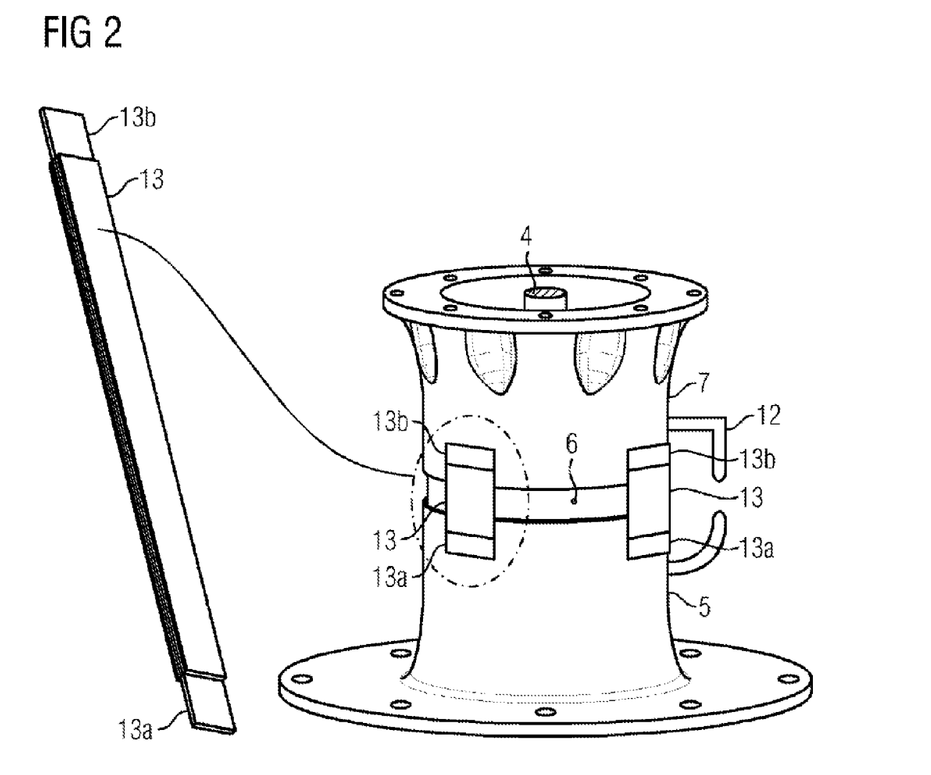
FIG. 2 shows a perspective view of a housing of the current transformer arrangement with a capacitor.

It can be seen from FIG. 2 that the first housing part 5 and the second housing part 7 are each in the form of a connector, with the two housing parts 5, 7 being mechanically connected to one another and held via the electrically insulating gap 6. In this case, both the first housing part 5 and the second housing part 7 have a tubular configuration, with these tubular structures being aligned rotationally symmetrically with respect to one another. The two housing parts 5, 7 are in this case arranged coaxially to the phase conductor 4. The two housing parts 5, 7 are each provided with flanges on those sides of the two housing parts 5, 7 which are remote from one another. A fluidtight connection of the housing parts 5, 7, for example by means of the first connector 3 or by means of an outdoor bushing 9, for example, is possible via the flanges. Owing to a selection of the dimensions of the flanges provided on the housing parts 5, 7, a transition between differently dimensioned cross sections at the first connector 3 and at the outdoor bushing 9 is also made possible. A corresponding reduction in diameter of the flanges is provided via the housing parts 5, 7.

The electrically insulating gap 6 is arranged at the mutually facing ends of the two housing parts 5, 7. The gap 6 is implemented, for example, by means of an electrically insulating tube, for example consisting of a polymer, ceramic or the like. In this case, a connection between the two housing parts 5, 7 and the electrically insulating gap 6 can be provided in a variety of ways. For example, the tube provided for forming the electrically insulating gap 6 can be adhesively bonded, cast, screwed, flange-connected or connected with an alternative configuration to the two housing parts 5, 7. Preferably, a fluidtight connection can be implemented between the electrically insulating gap 6 and the two housing parts 5, 7, with the result that the interior of the housing can be filled with an electrically insulating fluid at elevated pressure around the phase conductor 4.

By way of example, FIG. 2 illustrates how the surge protection arrangement can be equipped with capacitors 13. The capacitors 13 are in this case arranged distributed over the outer circumference of the housing, with the capacitors 13 bridging in each case the electrically insulating gap 6 with their connection points and being electrically conductively connected to the first and second housing parts 5, 7, respectively. Preferably, the capacitors 13 can be configured in the manner of the plate capacitor illustrated in enlarged form, i.e. a plurality of layers of capacitor plates are arranged between the connection points 13$a$, 13$b$, said capacitor plates being separated from one another via a dielectric. As a result, flat capacitors 13 are formed which can be positioned at the housing of the current transformer arrangement on outer lateral surface areas of the housing without in the process the circumference of the current transformer arrangement being substantially enlarged. The electrodes of the coordinating spark gap 12 are each electrically conductively connected to one of the housing parts 5, 7. However, it is also possible for the use of a coordinating spark gap 12 to be dispensed with. As is known from FIG. 1, the surge protection arrangement is also located within the detection range of the secondary part 11, with a different design.

Figure 3:
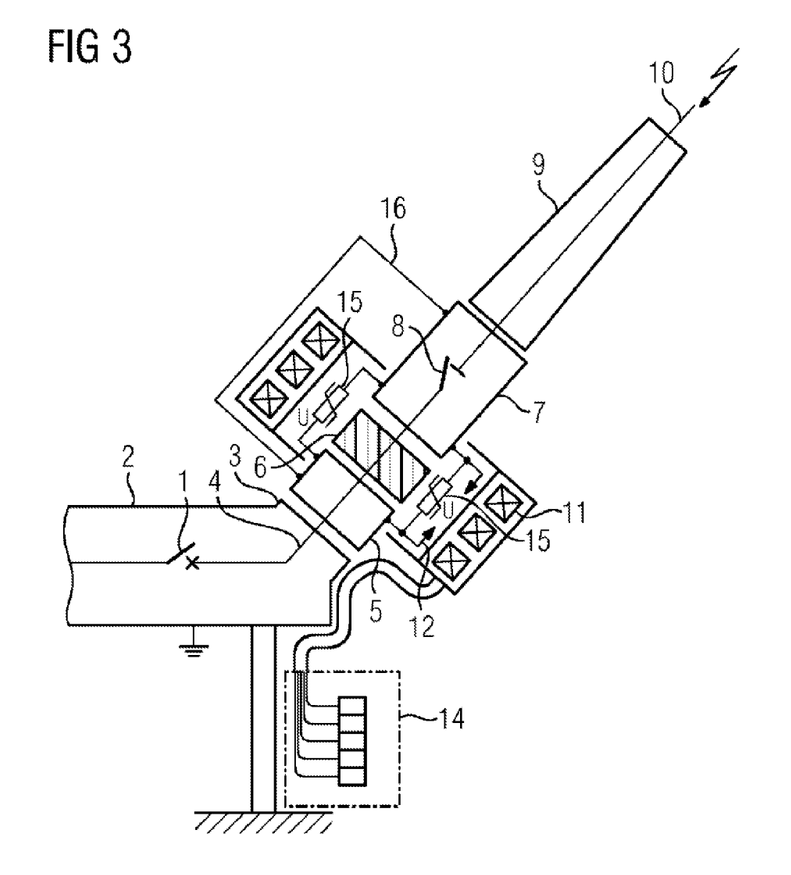
FIG. 3 shows a section through a current transformer arrangement with a surge protection arrangement with a varistor and a coordinating spark gap.

FIG. 3 shows a modification of the switching device known from FIG. 1. Correspondingly, functionally identical assemblies have been denoted by the same reference symbols in FIG. 3. Reference is made to the description relating to FIG. 1 in respect of the function of the functionally identical assemblies. The text below only discusses differences in respect of the configuration of the surge protection arrangement of the current transformer arrangement.

As a deviation from FIG. 1, use is made of varistors 15 which bridge the electrically insulating gap 6. A coordinating spark gap 12 is provided connected in parallel with the varistors 15. However, it is also possible to dispense with the use of such a coordinating spark gap 12.

In the case of a surge between the first housing part 5 and the second housing part 7 across the electrically insulating gap 6, the varistors are capable of reducing their impedance. In the event of the response voltage being undershot, the impedance of said varistors increases. This change in impedance is reversible. In this case, the use of a plurality of varistors 15 is provided, which varistors are arranged over the circumference of the housing of the current transformer arrangement. In addition to the use of varistors 15 in the surge protection arrangement, it is also possible to provide a combination with capacitors. Furthermore, in addition, the use of a coordinating spark gap 12 can also be provided. Dimensioning of the surge protection arrangement can in this case be dependent on the expected surges at the electrically insulating gap 6.

Figure 4:
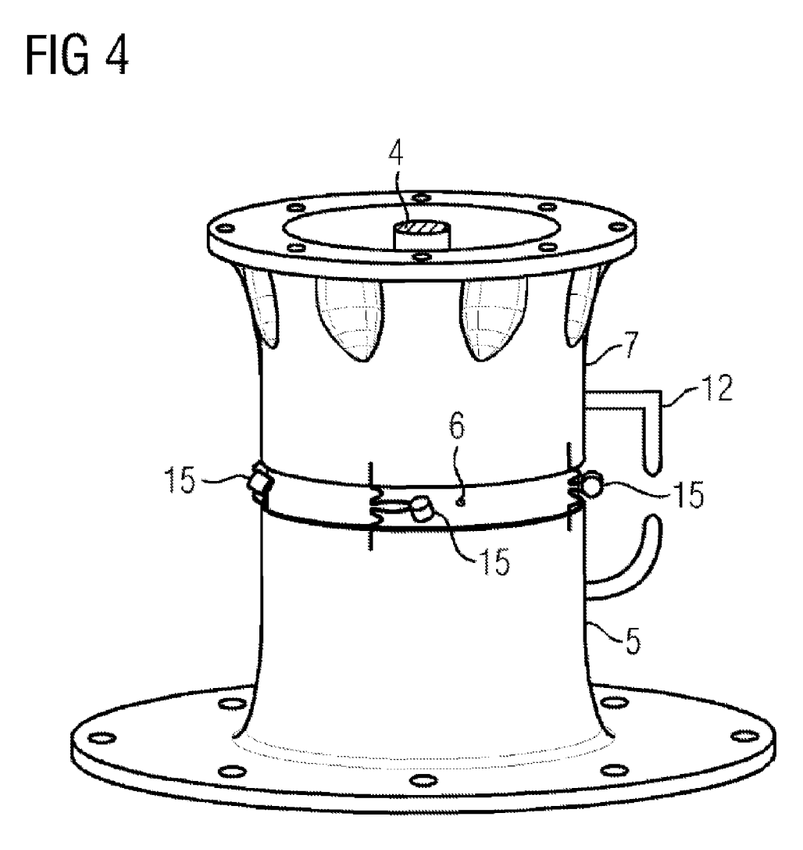
FIG. 4 shows a perspective view of a housing of the current transformer arrangement with a varistor.

FIG. 4 shows one possibility for an arrangement of a plurality of varistors 15 over the circumference of a housing across the electrically insulating gap 6. A plurality of varistors 15 are arranged over the circumference of the housing shown in FIG. 4, with each of these varistors being connected electrically in parallel with one another and connecting the two electrically conductive housing parts 5, 7 to one another and in the process forming a bridge across the electrically insulating gap 6. The configuration of the electrically conductive housing parts 5, 7 and the electrically insulating gap 6 can be gleaned from the description of the figures relating to FIG. 2. In the case of a potential difference which is present between the first housing part 5 and the second housing part 7 above the response threshold of the varistors 15, a reduction in impedance of the varistors 15 arises. Via the varistors 15, a leakage current path is produced between the two housing parts 5, 7 and a grounding current path is formed from the second housing part 7 via the connected varistors 15 to the first housing part 5 and then via the first connector 3 and the circuit breaker encapsulating housing 2, which grounding current path serves to reduce the surge by means of a grounding current.

The invention claimed is:

1. A current transformer configuration, comprising:
 a primary part;
 a secondary part;
 a housing surrounding said primary part and passing through said secondary part, said housing having first and second electrically conductive housing parts;
 at least one electrically insulating and fluid-tightly closed gap disposed between said first and second electrically conductive housing parts; and
 a surge protection configuration bridging said gap.

2. The current transformer configuration according to claim 1, wherein said surge protection configuration has a frequency-dependent impedance element.

3. The current transformer configuration according to claim 2, wherein said impedance element has a capacitor.

4. The current transformer configuration according to claim 3, wherein said capacitor is in the form of a plate capacitor.

5. The current transformer configuration according to claim 4, wherein said plate capacitor is one of a plurality of plate capacitors disposed in parallel in a profile of said gap so as to bridge said gap.

6. The current transformer configuration according to claim 1, wherein said surge protection configuration has a voltage-dependent impedance element.

7. The current transformer configuration according to claim 2, wherein said impedance element has a coordinating spark gap.

8. The current transformer configuration according to claim 6, wherein said impedance element has a coordinating spark gap.

9. The current transformer configuration according to claim 6, wherein said impedance element has a varistor.

10. The current transformer configuration according to claim 1, wherein said gap extends in radial direction between said primary part and said secondary part.

* * * * *